United States Patent [19]

Müller et al.

[11] Patent Number: 5,317,987

[45] Date of Patent: Jun. 7, 1994

[54] INDICATOR FOR DISPLAY OF ELAPSED TIMES AND/OR OF THE MOMENT WHEN CHANGES OF STATE OCCUR

[75] Inventors: Hubert Müller, Endingen; Bruno Langenfeld, Waldkirch, both of Fed. Rep. of Germany

[73] Assignee: Badische Tabakmanufaktur Roth-Handle GmbH, Lahr/Schwarzwald, Fed. Rep. of Germany

[21] Appl. No.: 878,217

[22] Filed: May 4, 1992

[63] This application is a continuation-in-part of PCT EP90/01797, Oct. 23, 1990.

[30] Foreign Application Priority Data

Nov. 2, 1989 [DE] Fed. Rep. of Germany ....... 3936542

[51] Int. Cl.$^5$ .............................................. G04F 13/00
[52] U.S. Cl. .................................................... 116/206
[58] Field of Search ................................ 116/206, 207

[56] References Cited

U.S. PATENT DOCUMENTS

| 3,520,124 | 7/1970 | Myers | 368/092 |
| 4,028,876 | 6/1977 | Delatorre | 116/206 X |
| 5,045,283 | 9/1991 | Patel | 116/206 X |

FOREIGN PATENT DOCUMENTS

| 3029289 | 2/1981 | Fed. Rep. of Germany . |
| 3210907 | 7/1984 | Fed. Rep. of Germany . |
| 3717025 | 8/1988 | Fed. Rep. of Germany . |
| 3907683 | 4/1991 | Fed. Rep. of Germany . |

OTHER PUBLICATIONS

"Beitrag zur Theorie des Anlaufvorgangs" by Carl Wagner, pp. 25-41, Jan. 27, 1933.

Primary Examiner—William A. Cuchlinski, Jr.
Assistant Examiner—W. Morris Worth
Attorney, Agent, or Firm—Birch, Stewart, Kolasch & Birch

[57] ABSTRACT

An indicator for attachment to objects to display elapsed times and/or changes of state, in which a visible display is brought about by color change of the indicator upon reaction of chemical substances and with destruction of a barrier preliminarily separating the chemical substances. The barrier is a separating or covering layer that can be penetrated by selective pitting by a chemical substance preliminarily enclosed by the barrier. An embodiment of the invention includes selective pitting of the barrier member with a resulting visible change of the indicator. Another embodiment of the invention includes initial separation of two chemical substances that can react with one another with visible change, of which at least one reacts chemically with the barrier for the latter's penetration.

11 Claims, 1 Drawing Sheet

INDICATOR FOR DISPLAY OF ELAPSED TIMES AND/OR OF THE MOMENT WHEN CHANGES OF STATE OCCUR

This is a Continuation-In-Part application of International Application No. PCT/EP90/01797 with an International filing date of Oct. 23, 1990 which designated the United States.

BACKGROUND OF THE INVENTION

1. Field of the Invention

The present invention relates to indicators and more particularly to decay indicators, degree of ripeness indicators (in fermentation processes), general elapsed time indicators and the like, which can be applied to objects which are perishable or subjected to other changes of state, to provide to the consumer, user, or any control person a visible display that the moment has arrived in which a change of state in the object, and in the case of the simple elapsed time, has taken place or is to be expected.

2. Description of Related Art

Such indicators have been known in various forms. An indicator in which a visible display is brought about by color or change of the indicator by reaction of chemical substances and with destruction first of a barrier separating chemical substances is the object of prior patent application P 39 07 683 of the applicant. In the prior application, two chemical compounds reacting with one other under visible color change are first impeded in the reaction by microencapsulation. If the barrier of the reactant formed by the microcapsules is then destroyed by action of mechanical pressure, the reaction can begin.

Numerous other indicators to display elapsed times and/or changes of state have also become known, which aim at a solution of the varied requirements of indicators for respective purposes.

DE-30 29 289 shows an aging indicator, which is to be applied, for example, to perishable foods and consists of at least one sealed container, which includes a single compartment and contains at least one fluid, which is able to travel or to diffuse outward as a function of time and temperature through at least one part of the container, and the aging of the related product is evaluated by determining the amount of fluid leaked from this container.

DE-PS 32 10 907 relates to an indicator, in which the time/temperature stress of objects is detected in a fluid medium by the extent of penetration of a solvent and to control the penetration depth to which gelling agents are added to the solids contained in a storage element. Between the storage element and the fluid substance, a barrier made from a film strip is present, however, and this film strip initially has to be removed.

DE-PS 37 17 025 shows a display device, in which an indicator compound contained in a storage chamber is brought into contact by a channel with an indicator strip by using outside pressure, and the discoloration of the indicator strip begins and continues over the entire strip and with continuous discoloration the end of the period is indicated. Between the storage antechamber and the display channel, a gate can be made which basically prevents penetration of the indicator compound into the display channel.

SUMMARY OF THE INVENTION

Starting from the above-mentioned related art, the object of the present invention is to make available an alternative design of indicators of the type in question, whose action mechanism indicates a readily predictable steady sequence behavior even when using standardized, commercial initial components of the indicator.

The principle of achieving the object produced by this invention is characterized in that a barrier is a separating or cover layer that can be penetrated by selective pitting by a chemical substance initially enclosed by the barrier. The additional chemical reaction provided for in the present invention between at least one of the indicator-reactants and the barrier makes possible, depending on the application, an exact prior determination of the course of the indication process with simple, commercially available components, and in this case allows, moreover, varied configurations depending on the purpose and available materials.

The configuration of the penetrable barrier as a metal foil has proven especially advantageous since such metal foils standardized with exact quality specifications in numerous variants are obtainable as commercial products and thus can be selected without special expense according to the respective requirements of use.

The instant invention is thus distinguished in that it allows for the design of indicators to display elapsed times and/or changes of state by using simple, commercial components, but in this case nevertheless allows for an exact preliminary planning of the display taking the respective influencing variables into account.

BRIEF DESCRIPTION OF THE DRAWINGS

Embodiments and details of this invention are described below with reference to the drawings and wherein.

DETAILED DESCRIPTION OF PREFERRED EMBODIMENTS

Figure 1:
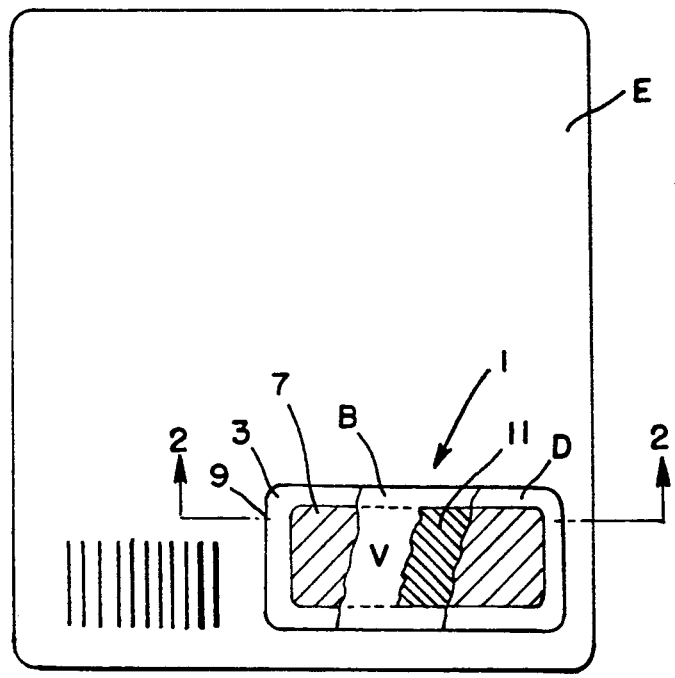
FIG. 1 shows a label with a decay indicator attached to the label according to this invention.

In FIG. 1, there is a label E, as it can be attached to packages, bottles and objects of the most varied types, for which the display of an elapsed time since production, use or else changes of state under the influence of temperature effects, radiation effects, exposure to light, moisture effect, atmospheric effect, and the like are of interest.

An indicator 1 is attached in the lower area on the label, which is used in a way to be described in more detail to indicate the above elapsed time and changes of state.

The indicator consists of the following components: a base 3, which is suitable for attaching to objects of the type in question (for example, by lower adhesive layer 5) or which can also be formed directly by label E, if its material is compatible with the chemical components of the indicator still to be described and allows for its secure attachment.

A first chemical substance 7 is applied to base 3, which is involved in the indication process in a way to be described in more detail. In this case, a marginal strip between the chemical substance 7 and edge 9 of the base remains free of the substance, which allows for the fastening of a barrier B, which seals the first-mentioned chemical substance 7 to the base 3. Barrier B can have a legible indication in the form of letter "V" or the like, which, in a way to be described in more detail depending on chemical substance 11 placed on it, does not become visible until after the monitored elapsed time, decay or the like.

The second chemical substance applied on the top side of barrier B also leaves a free marginal strip on barrier B, so that it can be enclosed by a covering foil D. Covering foil D is made from a material in a way to be described in more detail which permits an observation of the visible change occurring in the course of the chemical reaction in the decay indicator.

Base 3, barrier B and covering foil D of the decay indicator consists, moreover, of materials which permit a tightly closed connection of these three components with one another on the marginal strip, so that chemical substances 7 and 11 separated by barrier B are first each separately enclosed in the indicator. Barrier B, in a way to be described in more detail, is a separating or cover layer, which can be penetrated by one of the chemical substances with selective pitting of the barrier by which it is enclosed.

Figure 2:
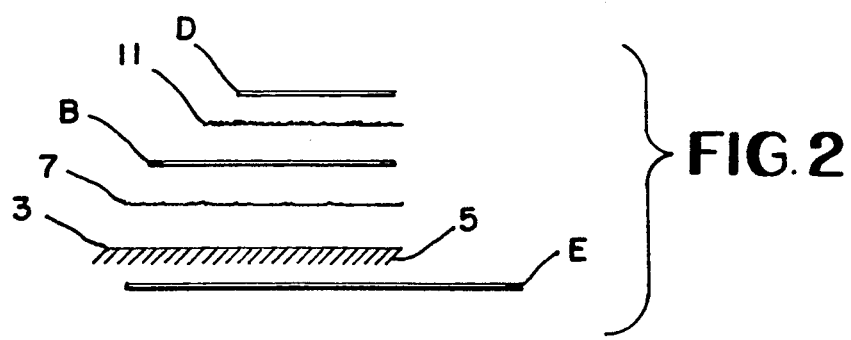
FIG. 2 shows diagrammatically the layer structure of the decay indicator according to line 2—2 of FIG. 1.

While base 3 and covering foil D consist of materials which cannot be destroyed by enclosed chemicals 7 and 11, barrier B according to this invention thus consists of a material which reacts with at least one of the chemical substances in such a way that either the chemical substances themselves react with one another and can produce the desired display of the elapsed time, the decay, the degree of ripeness or the like, or a change of the indicator, for example, uncovering a colored base, becomes visible in a simplified embodiment by pitting on the barrier. In the latter case, the embodiment shown in FIG. 2 can be simplified by leaving out one of the chemical substances.

In this way, the chemical substance itself reacting with barrier B can also be microencapsulated or macroencapsulated, so that the reaction between the chemical substance and the barrier first begins after rupture of the capsules. In this way, the indicator according to this invention after its initial production can also be kept in stock for a prolonged time without the indicator reaction occurring, and the rupture of the capsules can then take place by a pressure roller at the desired moment (date of production, date of use or the like) and the indicator process can be actuated. If a very spontaneous optical display is to take place after the predetermined time has elapsed, the space in front of the barrier optionally can be evacuated or the space behind the barrier can be "worked on" with slight excess pressure derived from the reaction.

Because of the simple design, an indicator according to the invention is suitable for assembly-line production, and a marginal sealing or marginal locking can be produced automatically by prepunching or prestamping the individual components, so that an unintentional infiltration of adjacent parts by the chemical substances used is prevented and also a protection of the contained corrosive or dissolving chemical substances against unauthorized handling is provided. An applied finish-lamination can contribute further to this end.

An essential feature of this invention lies in the fact that the chemical substances separated by barrier B and the chemical substances enclosed by base 3 and covering foil D react chemically with the barrier and can react with one another only after penetrating the barrier.

In the chemical reaction between a chemical substance and barrier B, a specific, time-dependent pitting corrosion can be used, which can be controlled exactly by suitable selection of the chemical substances used and the material of the barrier, so that the start of the actual indicator reaction between the chemical substances can also be exactly controlled. The beginning of the specific time-dependent pitting corrosion is started either when the indicator is assembled or by mechanical or photomechanical action on the microencapsulated or macroencapsulated or sealed-in chemical substances. The application of the chemical substances to base 1 and barrier B can take place by spraying, lamination or the like.

As barrier B, a commercial aluminized polymer sheet is suitable in the simplest case. Barriers, which are produced according to known processes from silk-screen print masking, laminating or laser photoetching techniques, are also suitable and the etching process occurs in "predetermined sites of rupture" (grooves) caused in an optionally pre-corroded material, for example.

The last-mentioned, readily controllable techniques are mainly used if the desired elapsed time is to be tracked visibly along a time scale and, for example, the end point is to be emphasized especially prominently. This can be achieved, for example, by graduated barrier thickness. The layer thickness of the barrier can also be fixed at will and can be produced in an economical way by currentless precipitation (addition process).

Penetrating the barrier by at least one chemical substance 7 or 11 can take place by elimination, permeation and/or penetration of the barrier by (protracted) dispensing of such corrosive or dissolving substances or their mixtures, which in isothermal use occur reproducibly in interaction with the barrier or a corresponding diaphragm and then cause a visible change after a predetermined time. This visible change of state, depending on the configuration of the barrier and/or cover layer of the indicator, can be previously concealed optical signals (such as the letter "V" in FIG. 1), a color change or the like. A luminescence reaction, design of a three-dimensional entity from the paper plane by gas generation and the like known in the art can also be used, and such effects can be detected optoelectronically also in a simple way, if an automated use of a decay indicator or another course is provided.

As corrosive or dissolving substances, known and commercially obtainable formulations from the electroplating or printed board technology can be used, which are obtainable in high purity and it is possible to restrict the invention in this case to those materials which are less harmful to the environment (gluconic acid and others).

As retarders, simple inert substances such as talc, $BaSO_4$, $MgO$, $MgCO_3$ from pharmacokinetics and the like are used. For encapsulation/sealing of the corrosive reagent or solvent, both chemical and mechanical-physical processes can be used. Here, methods of spray-drying are preferred, as well as the coating in the fluidized bed, and the solid, finely divided chemical nucleus is kept in suspension by a vertical aircurrent and is nozzled with the capsule material (Wurster process).

The capsule material can consist of synthetic polymer or preferably cellulose derivatives. The smooth, spherical capsule has proven readily reproducible.

As solubilizer, the group of complexing solubilizers of type EDTA, which contain traces of metal salt in solution for better transparency of the expected optical signal, are also suitable.

This invention of a corrosion-controlled time indicator uses the quantitatively readily controllable formation mechanisms of interconnected, compact, plane-parallel films made from metals, metal oxide-sulfides, as they have been described by C. Wagner. According to these tests, the layer formation quantitatively complies with the rate of reaction for cover layer formation according to $$d\Delta x/dt = const.$$

or $$\Delta x = const. \ t$$

The linear rate of reaction applies, when one or more boundary reactions are rate controlled. In the cases in which diffusion processes in the cover layer are rate-controlling, they follow the parabolic or, in especially small layer thicknesses, the logarithmic rate of reaction $x = a + b \log t$ of Tammann & Köster. In any case, the increase in the current-density potential-energy curves is proportional to the rate of corrosion. According to this invention, exactly defined, preferably metal layers on epoxide paper, polyester or polyimide film can be used for the barrier in the composition and layer thickness which consist of Mg, Al, Fe, Zn, Cu, Ni, Cr or their alloys, as well as brass 67 or 63, constantan, nickel brass or the like. Together with etching auxiliary agents made from $FeCl_3$, $CuCl_2$, $NH_4Cl$, $(NH_4)_2S_2O_8$, gluconic acid, etc. known, for example, from printed board manufacturing, as reactant, they form colored compounds or by removing the cover layer in order to make a colored background visible. In this case, exactly time-controlled reactions are produced, and in the simplest case, a previously concealed, but optically readily detectable signal color becomes visible after prior corrosion (e.g., red-fluorescent), or at least two chemical substances reacting with one another meet in a characteristic way (color reaction, gas generation). More generally, the at least one chemically reactive substance is a selected one of halide, sulfate, carbonate, hydroxide of a metal of group IA, IIA, IIB or VIII and/or their mixtures.

Below, two examples of embodiments of the invention are provided:

EXAMPLE 1

An approximately 6 cm² 35 μ-superpure aluminum foil, heat-sealed all-around on the edges, preferably in PET-foil bags, was spot-impregnated in the middle with 0.1 ml of commercial polyaluminum chloride solution FG before the sealing. Two days after the starting time and steady room temperature (21° C.), the aluminum foil was etched on the impregnated spot, so that the (fluorescent) signal coloring of the PET foil back of the sealed container became clearly visible on the front side.

EXAMPLE 2

Aluminum foil according to example 1 was impregnated with stoichiometrically excess sodium hydroxide etching solution as in Example 1. After a week, the aluminum foil was perforated so that a strip of polarity paper (containing phenolphthalein/NaCl) attached in front of the now perforated aluminum foil indicated the typical red signal coloring of phenolphthalein-Na.

In conclusion it can be pointed out that with this invention, a simple, readily reproducible overall concept for the production of indicators was provided to display decay, degree of ripeness, elapsed times and the like, which makes possible good availability, problem-free storage, simple startability with manual rollers, environmental compatibility (closed system), protection from unauthorized handling, production of commercially available machines and the use of other advantages. With this invention, it was recognized that thin commercially available foils, as they are used in electrolyte capacitors, printed circuits and the like, and also commercial microencapsulated donor substances, as they are used, for example, in the pharmaceutical field, also are usable for the production of such indicators. Relative to the production process, known filler units can be operated in a way which will not be described further herein, as well as for two-component filling devices as they are known from candy and sealing compound manufacturing (polyurethane foam disposable packaging).

We claim:

1. An indicator for displaying at least one of elapsed time and a moment when a change of state occurs, the indicator comprising:
   a base member selectively attachable to an object;
   at least one chemically reactive substance supplied on said base;
   a barrier member in contact with said at least one chemically reactive substance, wherein said barrier member is a foil diaphragm of a graduated thickness; and
   means for encapsulating said at least one chemically active substance and said barrier member against said base member in a viewable manner, whereby a visible display occurs in the indicator by selective pitting of said barrier member by said at least one chemically reactive substance.

2. The indicator according to claim 1, wherein the selective pitting of the barrier member produces a visible change of the indicator.

3. The indicator according to claim 1, wherein the barrier member separates two chemically reactive substances that can react with one another to result in a visible display, of which at least one chemically reactive substance reacts chemically with said barrier member for the selective pitting of said barrier member.

4. The indicator according to claim 1, 2 or 3, wherein said barrier member is selectively pitted by interaction with said at least one chemically reactive substance which is one of a corrosive substance, a dissolving substance and mixtures thereof, wherein said interaction is by a selected one of elimination, permeation and penetration thereof.

5. The indicator according to claim 4, wherein said at least one chemically reactive substance is a selected one of a halide, sulfate, carbonate, hydroxide of a metal of group IA, IIA, IIB or VIII and their mixtures thereof.

6. The indicator according to claim 1, wherein said barrier member is selected from the group of Mg, Al, Cu, Fe, Zn, Ni, Cr and their alloys.

7. The indicator according to claim 1, wherein said barrier member is previously etched.

8. The indicator according to claim 3, wherein said at least one chemically reactive substance penetrates said barrier member on the front side thereof and a second chemically reactive substance undergoes a state-changing chemical reaction on the rear side of said barrier member.

9. The indicator according to claim 3, wherein the chemically reactive substances are applied to said barrier member by spraying.

10. The indicator according to claim 1, wherein said at least one of the chemically reactive substances is one of microencapsulated and macroencapsulated.

11. The indicator according to claim 10, wherein said barrier member is coated on at least one side with a paper layer impregnated with one of the chemically reactive substances.

* * * * *